(12) United States Patent
Seo et al.

(10) Patent No.: US 12,468,493 B2
(45) Date of Patent: Nov. 11, 2025

(54) REMOTE MANAGEMENT SERVER TO GENERATE POLICY INCLUDING CONFIGURATION DATA FOR IMAGE FORMING APPARATUSES, RECEIVE A REQUEST FROM IMAGE FORMING APPARATUS FOR CHANGING THE CONFIGURATION DATA OF THE IMAGE FORMING APPARATUS

(71) Applicant: Hewlett-Packard Development Company, L.P., Spring, TX (US)

(72) Inventors: Giwon Seo, Seongnam Si (KR); Junghun Kim, Seongnam Si (KR); Hyungjong Kang, Seongnam Si (KR); Byeongju Hwang, Seongnam Si (KR); Minyoung Son, Pangyo (KR); Sangmi Kim, Seongnam Si (KR)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 18/561,870

(22) PCT Filed: Nov. 15, 2021

(86) PCT No.: PCT/US2021/059322
§ 371 (c)(1),
(2) Date: Nov. 17, 2023

(87) PCT Pub. No.: WO2022/250727
PCT Pub. Date: Dec. 1, 2022

(65) Prior Publication Data
US 2024/0281179 A1    Aug. 22, 2024

(30) Foreign Application Priority Data
May 25, 2021    (KR) .................. 10-2021-0067126

(51) Int. Cl.
*G06F 3/12*    (2006.01)
(52) U.S. Cl.
CPC .......... *G06F 3/1229* (2013.01); *G06F 3/1204* (2013.01); *G06F 3/1285* (2013.01); *G06F 3/1255* (2013.01); *G06F 3/1297* (2013.01)
(58) Field of Classification Search
None
See application file for complete search history.

(56) References Cited

U.S. PATENT DOCUMENTS 8,291,467 B2     10/2012    Aso et al.
8,401,415 B2 *    3/2013    Ananthesh ............... H04N 1/00
                                                        709/216

(Continued)

FOREIGN PATENT DOCUMENTS

JP    2007-094620 A    4/2007
JP    2007-233500 A    9/2007

(Continued)

*Primary Examiner* — Haris Sabah
(74) *Attorney, Agent, or Firm* — Brooks, Cameron & Huebsch, PLLC

(57) ABSTRACT

An example remote management server is operable to generate a policy including configuration data for image forming devices and a list of a plurality of image forming devices for which the configuration data is applied, receive, from one of the plurality of image forming devices, a request for a change in the configuration data for the image forming device, and process the request for the change in the configuration data in accordance with a preset rule.

14 Claims, 15 Drawing Sheets

(56) References Cited

U.S. PATENT DOCUMENTS

| | | | |
|---|---|---|---|
| 9,256,387 B2 | 2/2016 | Nishizawa | |
| 9,781,307 B2 | 10/2017 | Xu et al. | |
| 2002/0049839 A1* | 4/2002 | Miida | G06F 11/3013 |
| | | | 709/224 |
| 2007/0283414 A1 | 12/2007 | Sugiyama | |
| 2013/0321861 A1* | 12/2013 | Ishihara | H04L 67/51 |
| | | | 358/1.15 |
| 2014/0355049 A1* | 12/2014 | Hadano | G06F 3/1287 |
| | | | 358/1.15 |
| 2015/0070725 A1* | 3/2015 | Monden | G06F 3/1292 |
| | | | 358/1.15 |
| 2015/0268911 A1* | 9/2015 | Sato | G06F 3/1259 |
| | | | 358/1.14 |
| 2016/0014161 A1* | 1/2016 | Sato | H04L 63/083 |
| | | | 726/1 |
| 2017/0279978 A1* | 9/2017 | Osadchyy | H01M 4/625 |
| 2018/0300091 A1 | 10/2018 | Nakahara | |
| 2019/0364091 A1 | 11/2019 | Askland et al. | |
| 2021/0120139 A1* | 4/2021 | Kobayashi | H04N 1/00244 |

FOREIGN PATENT DOCUMENTS

| | | |
|---|---|---|
| JP | 2007-323324 A | 12/2007 |
| JP | 2012-114855 A | 6/2012 |

* cited by examiner

FIG.2

```
Policy A : {
  policyName : "Policy A",
  attributeList : [
    { type : property1, value : true },
    { type : property2, value : true },
    { type : App, value : [ name : App 1, appConfig : {Option1 : 300dpi, Option2 : Color, ...}]},
    { type : App, value : [ name : App 2, appConfig : {Option1 : 200dpi, Option2 : Mono, ...}]},
  ],
  deviceResourceIdList : [Device a, Device b, Device c, ... ]
}
```

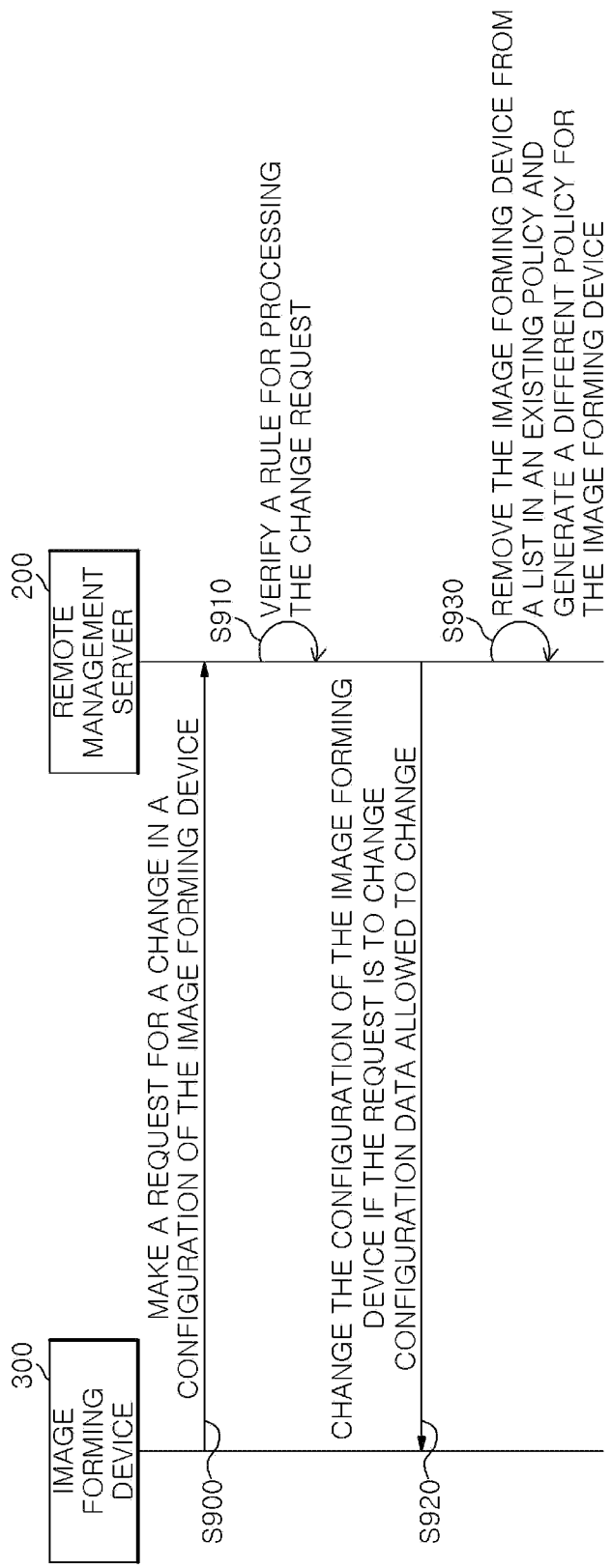

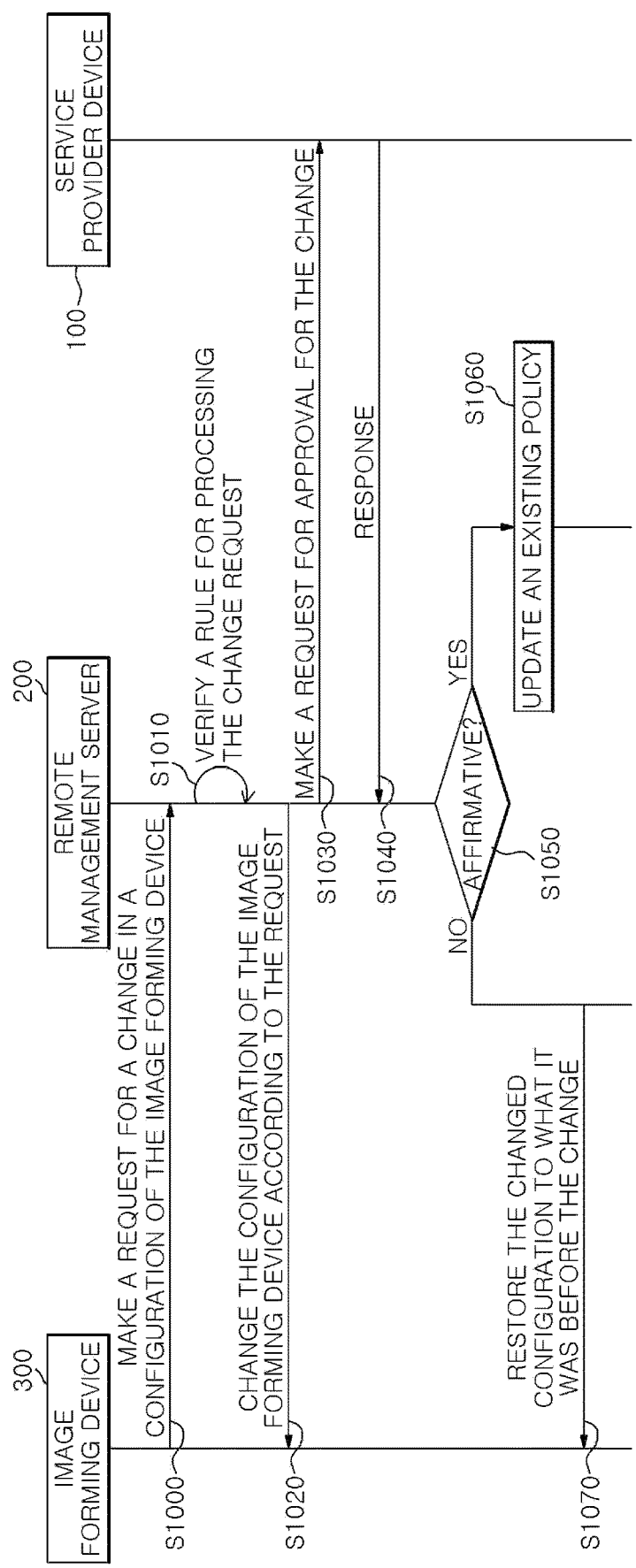

FIG.11

```
Policy A : {
  policyName : "Policy A",
  attributeList : [
    { type : property1, value : true },
    { type : property2, value : true },
    { type : App, value : [ name : App 1, appConfig : {Option1 : 300dpi, Option2 : Color, ...}]},
    { type : App, value : [ name : App 2, appConfig : {Option1 : 200dpi, Option2 : Mono, ...}]},
  ],
  deviceResourceIdList : [Device a, Device b, Device c, ... ]
}
```

```
Policy A : {
  policyName : "Policy A",
  attributeList : [
    { type : property1, value : true },
    { type : property2, value : true },
    { type : App, value : [ name : App 1, appConfig : {Option1 : 300dpi, Option2 : Color, ...}]},
    { type : App, value : [ name : App 2, appConfig : {Option1 : 200dpi, Option2 : Mono, ...}]},
  ],
  deviceResourceIdList : [Device b, Device c, ... ]
}
```

FIG. 15

Policy A
NOTE: POLICY FOR DEVICE MANAGEMENT FOR CLIENT A
TIME POINT OF APPLICATION: 2:00 A.M. AT THE END OF EACH MONTH

POLICY SETTING

○ FIRST RULE: REJECT THE REQUESTED CHANGE

◉ SECOND RULE: ACCEPT THE REQUESTED CHANGE
  ○ REMOVE THE DEVICE(S) FROM THE POLICY
  ○ REMOVE THE DEVICE(S) FROM THE POLICY AND ADD THE SAME TO THE POLICY UPON REBOOTING/ONBOARDING
  ◉ REMOVE THE DEVICE(S) FROM THE POLICY AND GENERATE A NEW POLICY

○ THIRD RULE: ACCEPT THE REQUESTED CHANGE IN SELECTED CONFIGURATION DATA ONLY
  ○ REMOVE THE DEVICE(S) FROM THE POLICY
  ○ REMOVE THE DEVICE(S) FROM THE POLICY AND ADD THE SAME TO THE POLICY UPON REBOOTING/ONBOARDING
  ○ REMOVE THE DEVICE(S) FROM THE POLICY AND GENERATE A NEW POLICY

| ATTRIBUTE/SETTING ALLOWED TO CHANGE |
|---|
| DEVICE ATTRIBUTE 1 ☑ |
| DEVICE ATTRIBUTE 2 ☑ |
|  ☐ |

○ FOURTH RULE: ACCEPT THE REQUESTED CHANGE AND REQUEST THE SERVICE PROVIDER'S APPROVAL

REMOTE MANAGEMENT SERVER TO GENERATE POLICY INCLUDING CONFIGURATION DATA FOR IMAGE FORMING APPARATUSES, RECEIVE A REQUEST FROM IMAGE FORMING APPARATUS FOR CHANGING THE CONFIGURATION DATA OF THE IMAGE FORMING APPARATUS

BACKGROUND

There exist many different types of image forming devices, including dedicated printers, scanners, copiers, facsimile machines, etc., and also multi-function products (MFPs) that act as an all-in-one solution to provide a combination of, e.g., printing, copying, scanning, and faxing functions.

In this connection, an image forming device may change its device settings to adjust its functionality and may also be utilized with a number of applications installed therein, each of which can change and use a setting value.

BRIEF DESCRIPTION OF THE DRAWINGS

Various examples will be described below by referring to the following figures.

FIG. 2 is a diagram depicting a policy, according to an example.

FIGS. 3 to 10 are flow diagrams, each of which illustrates processing of a separate request for a change in a configuration of an image forming device to which a policy is applied, according to various examples.

FIGS. 11 and 12 are diagrams depicting changes in a policy, according to various examples.

FIG. 15 is a schematic illustration of a user interface for selecting a rule for processing a separate request, from an image forming device to which a policy is applied, for a change in its configuration, according to an example.

DETAILED DESCRIPTION

Figure 1:
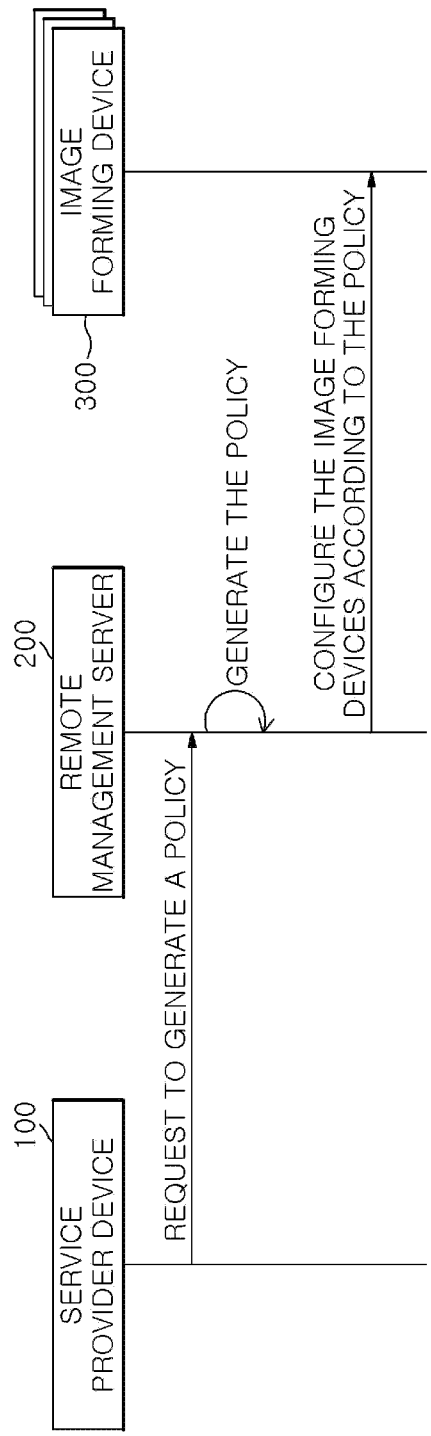
FIG. 1 is a diagram conceptually depicting a system, including a service provider device, a remote management server, and a plurality of image forming devices, where a policy is applied to manage configuration data for the image forming devices, according to an example.

In various examples of the present disclosure, a service provider, for example, a reseller, may manage a plurality of image forming devices by placing, into a policy, configuration data including setting information for each of the plurality of image forming devices, a list of applications to be installed in each of the image forming devices, and setting information for each of the applications. This policy may be generated, changed, and distributed by a remote management server which is coupled with the plurality of image forming devices.

Based on the service provider managing the plurality of image forming devices by using his/her service provider device or the remote management server to apply identical configuration data to each of the plurality of image forming devices, the application of the configuration data is not performed on a one-by-one basis. Rather, the policy may be generated from a list of the targeted image forming devices and the same configuration data to be applied thereto, and the listed targeted image forming devices may be configured all together with the configuration data in accordance with the policy. For the plurality of image forming devices, the same configuration data may be maintained in a dynamic fashion by application of the generated policy to those image forming devices, for example, at certain time points or intervals.

Further, with such dynamic policy function employed to manage the plurality of image forming devices, a request may be made for a change in the configuration data for an individual one of the plurality of image forming devices. However, if made without regard to the policy, the change might then be overwritten with application of the policy to that device. The conflict between the policy and the change request might otherwise result in a failure of the dynamic policy function.

Examples described herein provide for processing of a request for a change in configuration data for an individual one of a plurality of image forming devices to which a policy is applied for their integrated management.

Various terms used in the present disclosure are chosen from a terminology of commonly used terms in consideration of their function herein, which may be appreciated differently depending on an intended implementation, a precedent case, or an emerging new technology. In certain instances, some terms are to be construed as set forth in detail in the detailed description. Accordingly, the terms used herein are to be defined consistently with their meanings in the context of the present disclosure, rather than simply by their plain and ordinary meaning.

The terms "comprising," "including." "having," "containing," etc. are used herein to specify the presence of the elements listed thereafter. Unless otherwise indicated, these terms and variations thereof are not meant to exclude the presence or addition of other elements.

As used herein, the ordinal terms "first," "second," and so forth are meant to identify several similar elements. Unless otherwise specified, such terms are not intended to impose limitations, e.g., a particular order of these elements or of their use, but rather are used merely for referring to multiple elements separately. For instance, an element may be referred to in an example with the term "first" while the same element may be referred to in another example with a different ordinal number such as "second," "third," etc. In such examples, such ordinal terms are not to limit the scope of the present disclosure. Also, the use of the term "and/or" in a list of multiple elements is inclusive of all possible combinations of the listed items, including any one or a plurality of the items.

The term "image forming job" as used herein may encompass any of a variety of image-related jobs that involve an operation of forming an image and/or other processing operations, e.g., creation, generation, and/or transfer of an image file. The term "job" as used herein may encompass a chain of processes that facilitate an image forming job, as well as the image forming job per se. By way of example and not limitation, an image forming device may perform an image forming job, such as a print job, a copy job, a scan job, a facsimile, or other transmission job, a storage job, a coating job, or the like.

The term "image forming device" or "image forming apparatus" as used herein may encompass any of a variety of devices, such as a printer, a copier, a scanner, a facsimile machine, a multi-function product (MFP), a display device, and the like, that is capable of performing an image forming job. In some examples, an image forming device may be a two-dimensional (2D) or a three-dimensional (3D) image forming device. Such image forming device may provide various additional functions, as well as basic ones, for example, print, copy, and scan functions.

The term "user" as used herein may refer to a person who manipulates an image forming device to perform an image forming job. Further, the term "administrator" as used herein may refer to a person who has access to the entire functionality of an image forming device. In some examples, one person may have both roles of an administrator and user.

The term "service provider" as used herein may refer to a person who supplies an image forming device to a user and has control of the functions and settings of the image forming device. By way of example and not limitation, a service provider may be a reseller who lends a plurality of image forming devices to a particular user or group, applies device setting values of the plurality of image forming devices according to an established contract, and controls and manages installation of an application and a setting value of the application.

The terms "electronic device," "electronic apparatus," or "user device" as used herein may refer to any information processing device, such as, for example, a computer, a laptop, a table PC, a mobile telephone terminal, or the like, that may be used by a user.

Examples of the present disclosure will now be described with reference to the accompanying drawings. The present disclosure may, however, be embodied in many different forms and should not be construed as limited to the examples set forth herein. Rather, these examples are given in order to provide a better understanding of the scope of the present disclosure.

FIG. 1 is a diagram conceptually depicting a system, including a service provider device, a remote management server, and a plurality of image forming devices, where a policy is applied to manage configuration data of the image forming devices, according to an example.

Referring to FIG. 1, a service provider such as a reseller may make a request to a remote management server 200, which may configure a plurality of image forming devices, for generation of a policy, so as to configure and manage the plurality of image forming devices with identical configuration data. For example, the service provider may request, by way of the service provider device 100, the remote management server 200 to generate a policy including configuration data for image forming devices and a list of a plurality of image forming devices, e.g., a plurality of image forming devices 300, for which the configuration data is to be applied. The configuration data may include setting information for each image forming device, a list of applications to be installed in each image forming device, and setting information for each application. The remote management server 200 may generate a policy as requested and apply the generated policy to the plurality of image forming devices 300 in the list to configure each of the image forming devices 300 with the configuration data specified in the policy.

Further, the service provider may set a periodic interval of time, or a point in time, at which the policy is to be applied to the image forming devices 300. In other words, a job of configuring the image forming devices 300 with the configuration data in accordance with the policy may be performed upon generation of the policy, and/or repeatedly at certain time intervals or points. For example, the service provider may specify that the policy is to be consistently applied to the image forming devices 300 at daily or weekly intervals. Accordingly, if the service provider changes the policy, the new policy may be applied to each of the listed image forming devices 300 at a specific time point so that the service provider may maintain those devices with the recent configuration data without performing a job on the devices in a one-by-one manner.

In addition, or alternatively, the remote management server 200 may manage the image forming devices 300 in a dynamic fashion by, for example, receiving, from the image forming devices 300, the currently set configuration data at a certain periodic interval or time point, or upon request by the service provider, comparing the received configuration data to the configuration data incorporated in the policy, and if it is determined based on a result of the comparison that there is a difference in the compared data, configuring the image forming devices 300 with the configuration data corresponding to the policy.

Further, based on receiving a request for onboarding of a new image forming device, the remote management server 200 may verify whether the new image forming device is one that appears in the list included in the policy. By way of example and not limitation, this may be performed by verifying whether an identifier of the new image forming device is among identifiers of the image forming devices that are included in the policy and are thus subject to management. By way of example and not limitation, the onboarding request may be made based on an existing image forming device being initialized and installed again or based on a new image forming device being provided by the service provider. For example, if a new image forming device is sold to a user by contract, the service provider may simply update the list of targeted image forming devices, included in the policy, so as to configure the new image forming device, together with those existing ones, with the same configuration data and continue to facilitate integrated management of the devices.

FIG. 2 is a diagram depicting a policy, according to an example.

Referring to FIG. 2, Policy A may define a setting value for a particular property of an image forming device. For example, FIG. 2 illustrates that property1 and property2 are set to true. By way of example and not limitation, a property may include a variety of attribute information such as ON/OFF settings of a power saving mode, a lockout mode, a fax function of the image forming device, etc. Further, Policy A may define a list of applications installed in the device and a setting value of each application. In the example of FIG. 2, the setting values for Apps 1 and 2 respectively indicate a 300 dpi resolution in a color mode and a 200 dpi resolution in a monochrome mode. Still further, Policy A may define a list of devices for which the above-mentioned property values are to be applied. In the example of FIG. 2, Device a, Device b, Device c, . . . denotes a list of image forming devices to which Policy A is to be applied.

FIGS. 3 to 10 are flow diagrams, each of which illustrates processing of a separate request for a change in a configuration of an image forming device to which a policy is applied, according to various examples.

It is contemplated that based on the remote management server 200 generating and distributing a policy to manage configuration data for the plurality of image forming devices 300, an individual one of the plurality of image forming devices may be manipulated by its administrator or its user (either of whom is referred to hereinafter as an "administrator") to attempt to change its configuration. In an example, while serving for, e.g., a group to which the plurality of image forming devices is leased and available, the administrator may attempt to change the configuration data for the individual image forming device by manipulating a touch screen of the device to identify and change setting information for the device. The configuration change requested in this separate way, if made without regard to the policy currently in effect, might then be cancelled with application of the policy to the device. In another example, where the policy is still supposed to be applied to the image forming device, the administrator may make the separate configuration change request without checking whether the policy is applied thereto. In examples of the present disclosure, a request "separately" made for a configuration change may refer to an attempt to change configuration data for an image forming device in a direct manner, rather than by changing a policy through which the device comes under management. Accordingly, in conjunction with application of the policy to the image forming device, certain techniques are to be considered for processing of the separate configuration change request.

In various examples where the request is made through the individual image forming device, to which the policy is applied, by the administrator for a change in the configuration data for the device, the remote management server 200 may process the separate configuration change request according to at least one of the following rules:

(i) a first rule for rejecting the requested change in the configuration data;

(ii) a second rule for accepting the requested change in the configuration data;

(iii) a third rule for accepting the requested change in the configuration data if the request is to change configuration data that is allowed to change; or (iv) a fourth rule for accepting the requested change in the configuration data and submitting, to a service provider of a plurality of image forming devices, including that image forming device, a request for approval for the change.

Now, some of these examples are described in more detail below.

Figure 3:
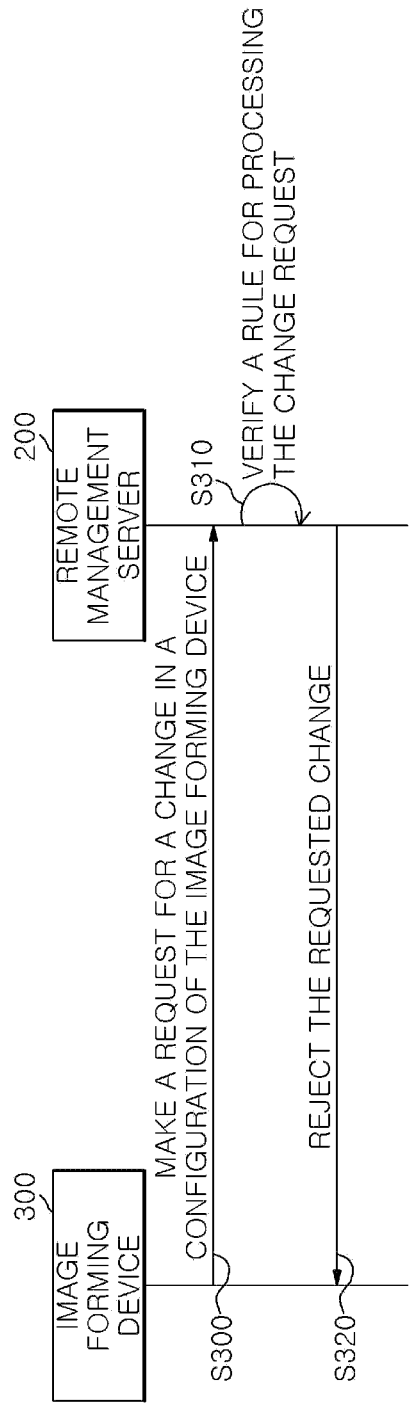

FIG. 3 is a flow diagram illustrating processing a separate request for a configuration change to an image forming device based on the first rule being applied, according to an example.

Referring to FIG. 3, an administrator of the image forming device 300 makes a request through the image forming device 300, for example, through an input unit such as a touch screen of the image forming device 300, for a change in a configuration of the image forming device 300 at operation S300. The requested configuration change to the image forming device 300 may include, for example, a change of a property value of the device, an installation of an additional application in the device, a removal of an application installed in the device, a change of a property value of an application installed in the device, and the like.

The remote management server 200 receives the change request and determines whether the received change request is to reconfigure the image forming device 300 being currently managed through a policy. If the change request is not to reconfigure the image forming device 300 currently under the policy-based management, this process flow may end with processing the change request accordingly. Further details thereof are not set forth herein for the sake of brevity.

If it is determined that the change request is to reconfigure one of the image forming devices 300 that appear in a list of targeted devices which is included in the currently applied policy, the remote management server 200 verifies a rule currently in use for processing a separate configuration change request at operation S310. In the illustrated example, the remote management server 200 verifies that the first rule is established, as the currently applied rule, to reject the requested change.

The remote management server 200 rejects the requested configuration change according to the first rule at operation S320. Additionally, the image forming device 300 may notify the administrator, for example, through a display of the image forming device 300, that the configuration of the device is prohibited under the currently applied policy from being changed and that any change in the configuration requires a change of the policy.

Figure 4:
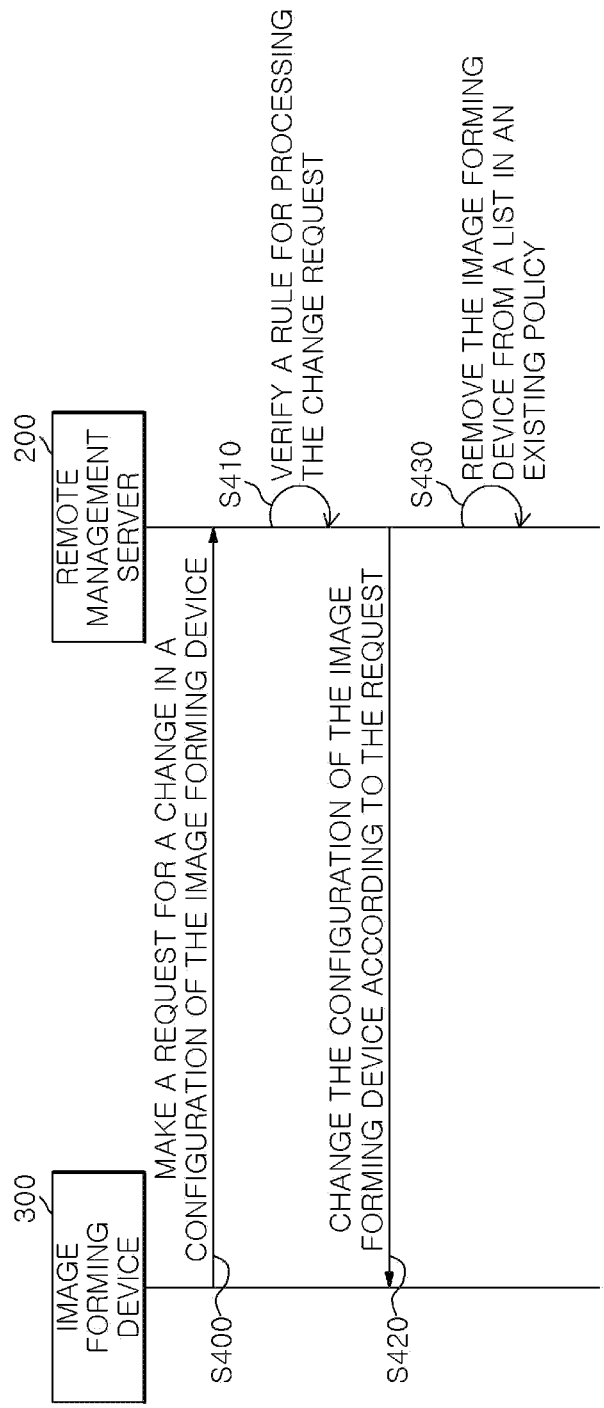
Figure 5:
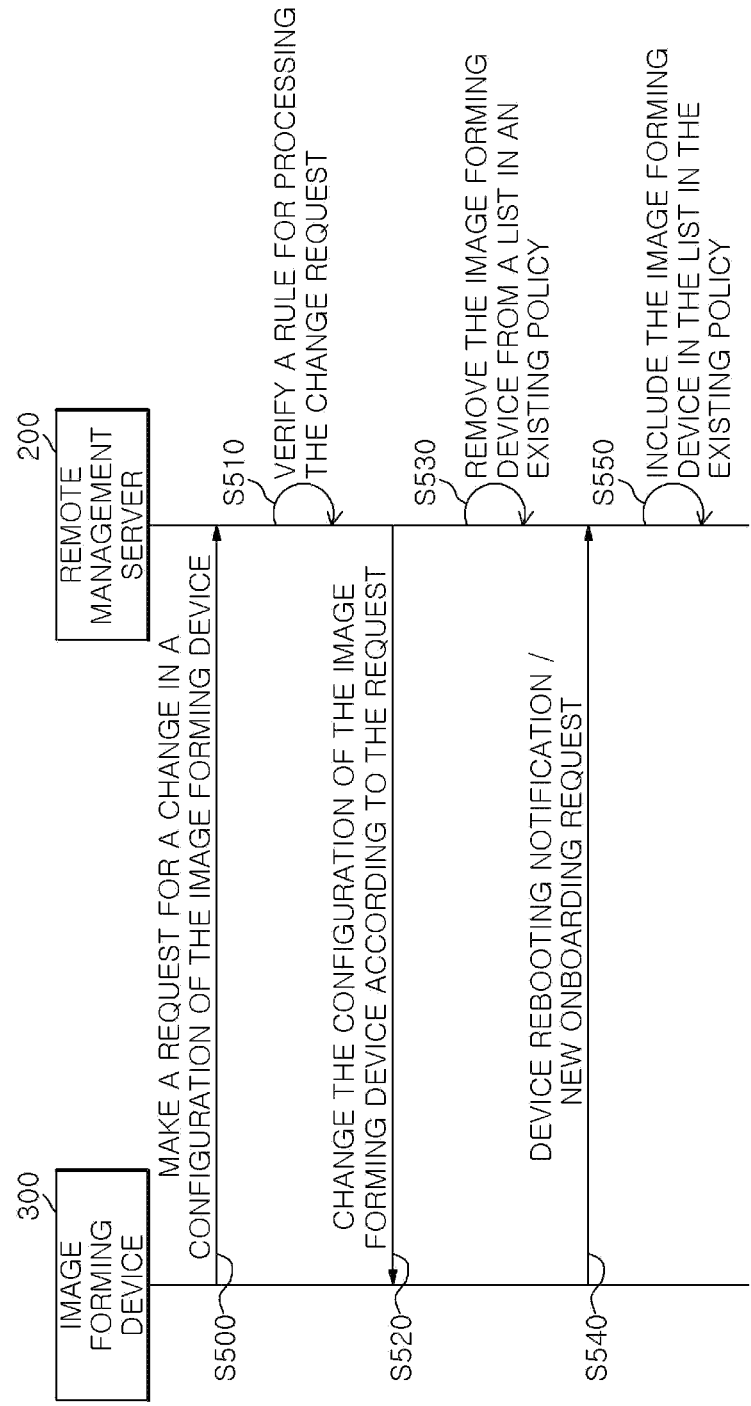
Figure 6:
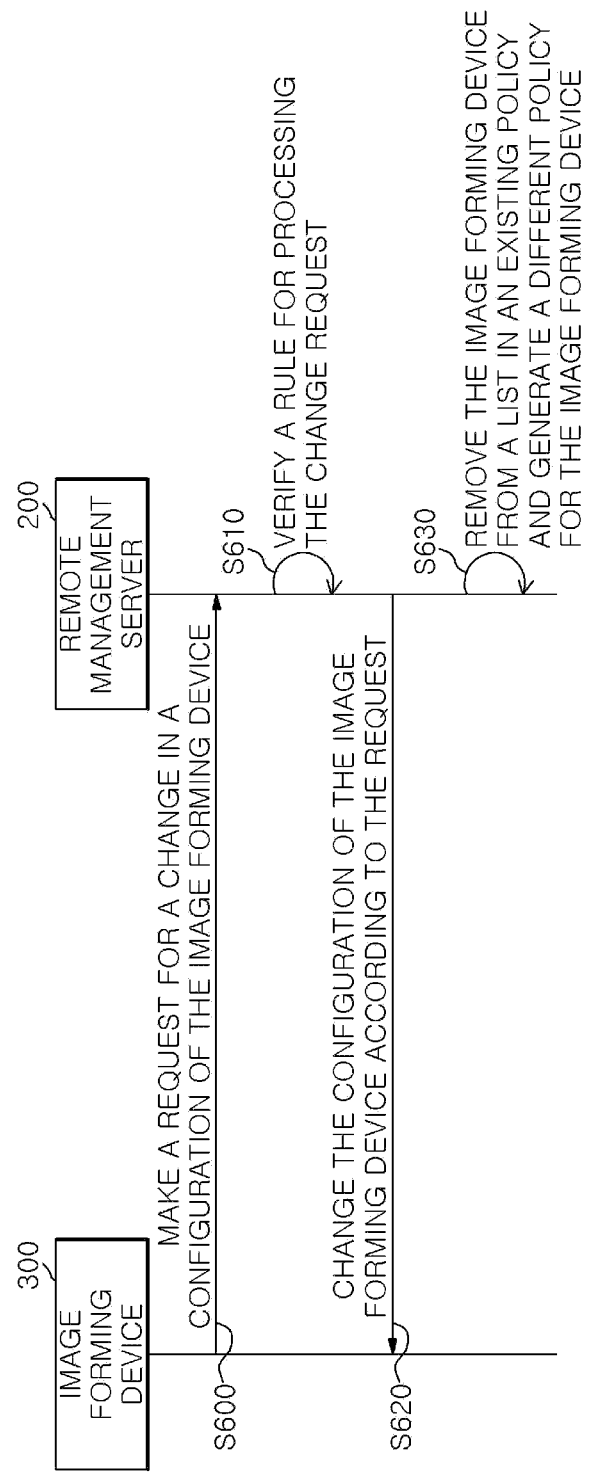

FIGS. 4 to 6 are flow diagrams illustrating processing a separate request for a configuration change to an image forming device based on the second rule being applied so that the separately requested configuration change is accepted, according to various examples.

FIG. 4 is a flow diagram illustrating processing a separate request for a configuration change to an image forming device based on the second rule being applied, according to an example.

Referring to FIG. 4, an administrator of the image forming device 300 makes a request through the image forming device 300 for a change in a configuration of the image forming device 300 at operation S400. At operation S410, the remote management server 200 receives the change request, determines whether the received change request is to reconfigure the image forming device 300 being currently managed through a policy, and verifies a rule currently in use for processing a separate configuration change request. For further details, reference may be made to the above description.

In the example of FIG. 4, the remote management server 200 verifies that the second rule is established, as the currently applied rule, to accept the requested change and update the policy to remove the image forming device from a target device list incorporated in the policy. With the separately requested configuration change accepted according to the second rule, the update of the policy may be carried out along with the change in the configuration data for the image forming device.

At operation S420, the remote management server 200 changes the configuration of that image forming device 300 based on the received change request for, e.g., a change of the power saving mode of the device from ON to OFF. At operation S430, the remote management server 200 updates the policy to remove the image forming device 300 from the list of targeted image forming devices, which is defined in the currently applied policy. That is, the image forming device 300 is no longer managed through the policy.

FIG. 11 illustrates a change in a policy based on the policy being updated according to the second rule, according to an example.

Referring to FIG. 11, Policy A has a target device list in which Device a is included before the change is made. In the example, where a request is separately made for a change in configuration data for Device a and processed according to the second rule, Policy A is then updated such that Device a is removed from the target device list.

FIG. 5 is a flow diagram illustrating processing a separate request for a configuration change to an image forming device based on the second rule being applied, according to an example.

Referring to FIG. 5, an example similar to the example of FIG. 4 is provided. In that regard, operations S500, S510, S520, and S530 are substantially the same as that described regarding operations S400, S410, S420, and S430 such that a redundant description will not be provided for sake of brevity. In the example of FIG. 5, in addition to processing the separate configuration change request as discussed above with respect to FIG. 4, based on being rebooted or onboarded to the remote management server 200, the image forming device 300 notifies the remote management server 200 of the rebooting or the onboarding in operation S540. In response, the remote management server 200 updates the policy to include, into the target device list in the policy, the image forming device 300 once again in operation S550. Accordingly, the image forming device 300 may be managed again through the policy.

FIG. 6 is a flow diagram illustrating processing a separate request for a configuration change to an image forming device based on the second rule being applied, according to an example.

Referring to FIG. 6, an administrator of the image forming device 300 makes a request through the image forming device 300 for a change in a configuration of the image forming device 300 at operation S600. At operation S610, the remote management server 200 receives the change request, determines whether the received change request is to reconfigure the image forming device 300 being currently managed through a policy, and verifies a rule currently in use for processing a separate configuration change request. For further details, reference may be made to the above description.

In the illustrated example of FIG. 6, the remote management server 200 verifies that the second rule is established, as the currently applied rule, to accept the requested change, update the policy to remove the image forming device from a target device list in the policy, and generate a different policy corresponding to the changed configuration data and the removed image forming device. At operation S620, the remote management server 200 changes the configuration of the image forming device 300 based on the received change request for, e.g., a change of the power saving mode of the device from ON to OFF. At operation S630, the remote management server 200 updates the policy to remove the image forming device 300 from the list of targeted image forming devices, which is defined in the currently applied policy, and also generates the different policy for the removed image forming device 300. That is, the image forming device 300 is now managed through the newly generated policy, rather than through the existing policy. The newly generated policy may include new configuration data in which the request for a change of a property value contained in the configuration data defined in the existing policy is reflected and may also include that image forming device as a targeted image forming device.

Figure 12:
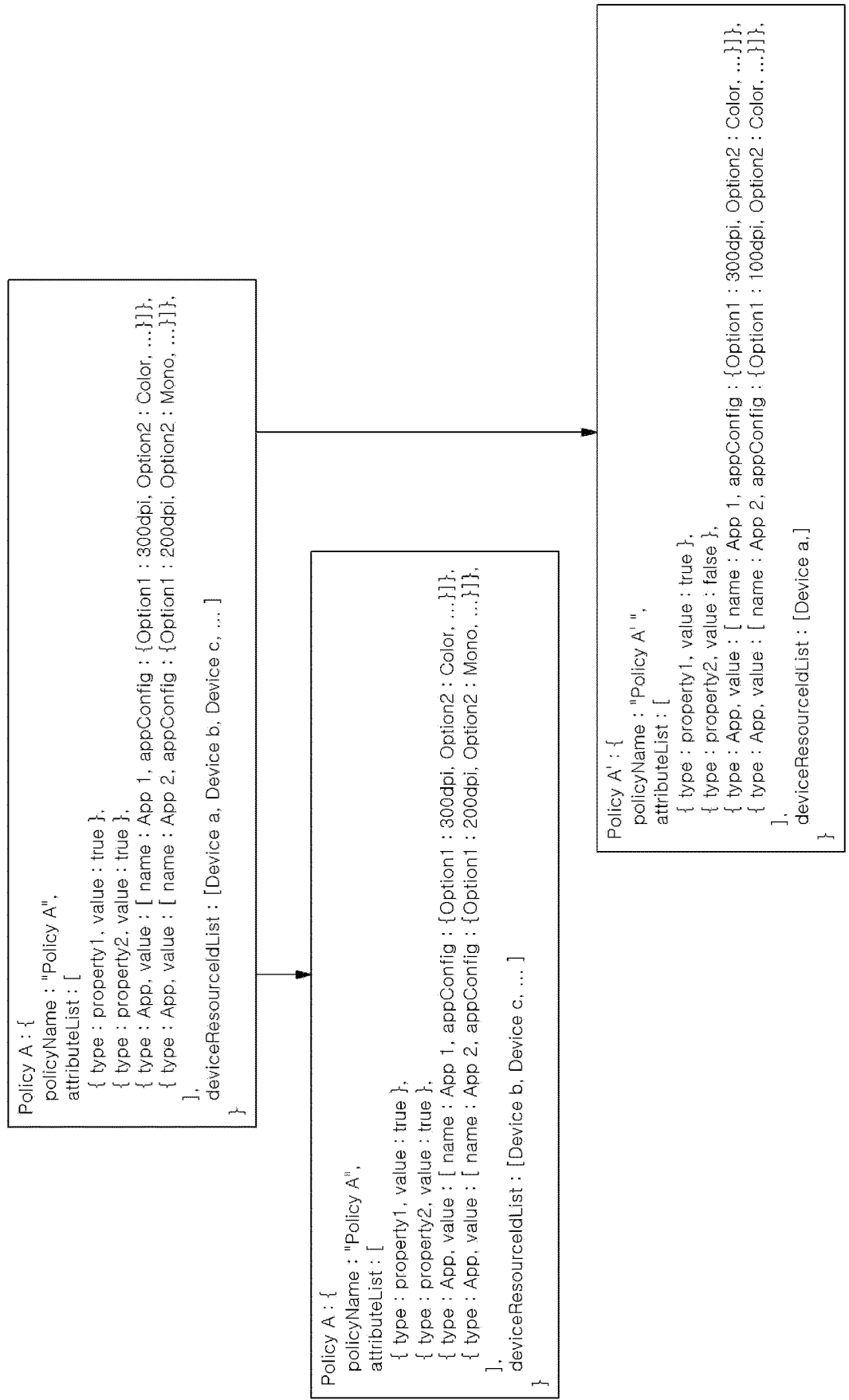

FIG. 12 illustrates a change in an example policy when the policy is updated according to the second rule. As can be seen in FIG. 12, Policy A has a target device list in which Device a is included before the change is made. In the example, where a request is separately made for a change in configuration data for Device a and processed according to the second rule, Policy A is then updated such that Device a is removed from the target device list. In addition, a new policy, i.e., Policy A', is generated for Device a. Policy A' is generated to have the configuration data redefined with a property value such that the value is a changed one, if requested as such, and otherwise an original one. The example of FIG. 12 shows that Policy A' is generated for Device a, with the value of property2 changed from true to false, and with the setting of App 2 changed from a 200 dpi resolution in a monochrome mode to a 100 dpi resolution in a color mode.

Figure 7:
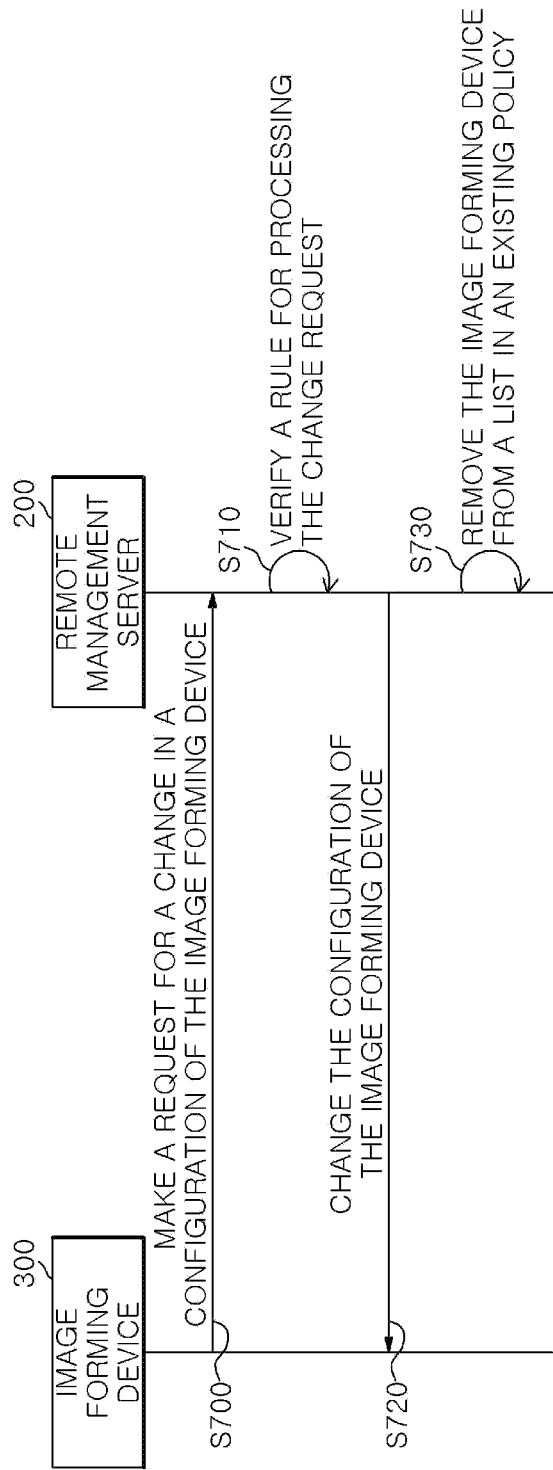
Figure 8:
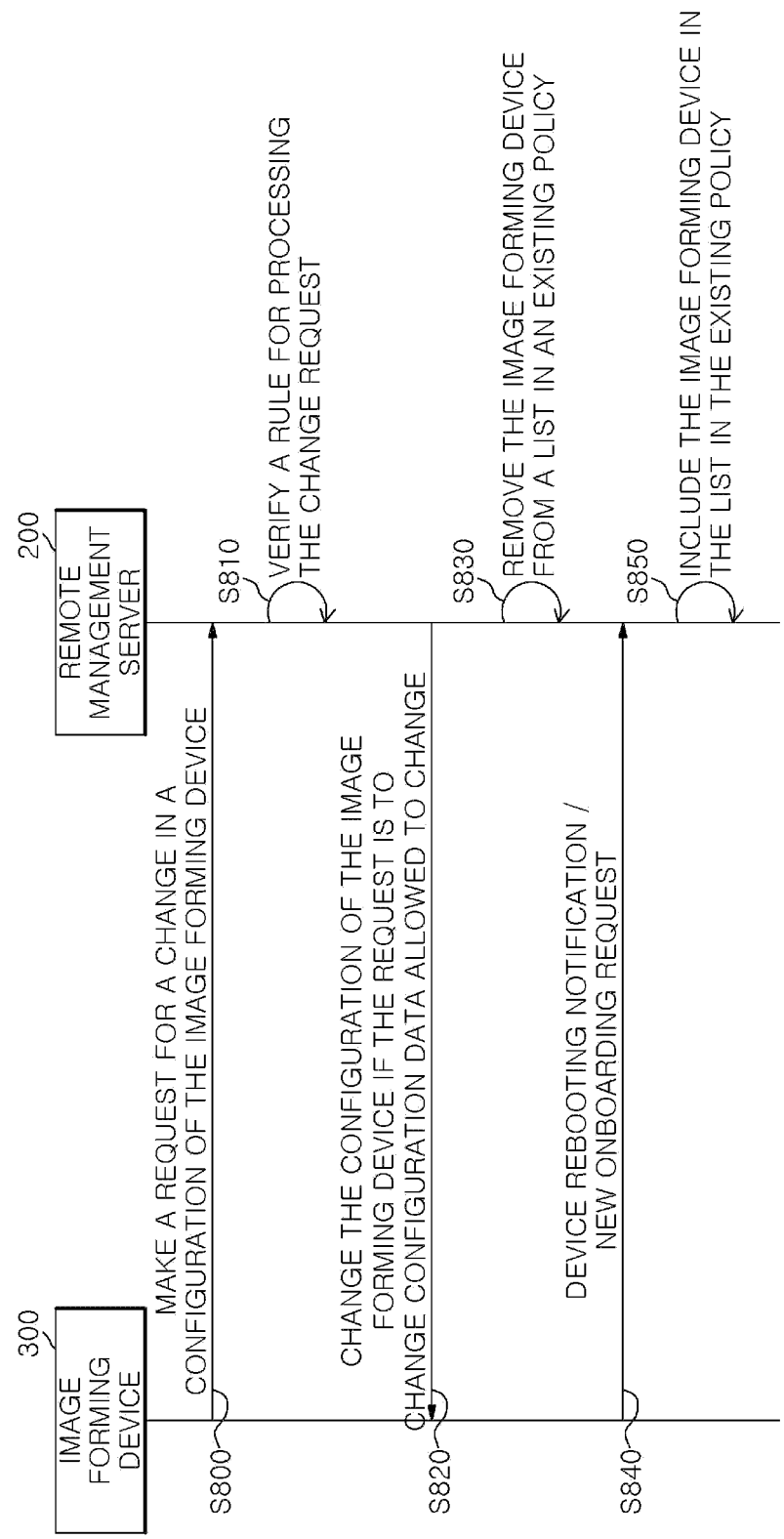

FIGS. 7 to 9 are flow diagrams illustrating processing a separate request for a configuration change to an image forming device based on the third rule being applied so that the separately requested change in configuration data is accepted if the request is to change configuration data that is allowed to change, according to an example.

The examples illustrated in FIGS. 7 to 9 are different from those described with respect to FIGS. 4 to 6 in that, unlike the second rule, the third rule is applied to accept a change in a portion of the configuration data that is allowed to change and to prevent another portion thereof from being changed. As discussed with respect to FIG. 2, a policy may be used for management of setting values including, for example, setting information for the device, a list of applications to be installed in the device, and setting information for each application. According to the third rule, some of these various setting values, which are managed through the policy, are allowed to be changed in a separate way while the others are not. Therefore, if a setting value that is not allowed to change is separately requested to be changed, the requested change is rejected as established by, e.g., the first rule, and if a setting value that is allowed to change is separately requested to be changed, the requested change is accepted as established by, e.g., the second rule.

FIG. 7 is a flow diagram illustrating processing a separate request for a configuration change to an image forming device based on the third rule being applied, according to an example.

The example of FIG. 7 is different from the example of FIG. 4 in that at operation S720, the image forming device 300 is allowed to be reconfigured with its configuration data that is allowed to change. The remaining operations of this process flow are identical to those described in FIG. 4. That is, operations S700, S710, and S730 of FIG. 7 are identical to operations S400, S410, and S430 of FIG. 4 such that a redundant description will not be provided for sake of brevity.

FIG. 8 is a flow diagram illustrating processing a separate request for a configuration change to an image forming device based on the third rule being applied, according to an example.

The example of FIG. 8 is different from the example of FIG. 5 in that at operation S820, the image forming device 300 is allowed to be reconfigured with its configuration data that is allowed to change. The remaining operations of this process flow are identical to those described in FIG. 5. That is, operations S800, S810, S830, S840, and S850 of FIG. 8 are identical to operations S500, S510, S530, S540, and S550 of FIG. 5 such that a redundant description will not be provided for sake of brevity.

FIG. 9 is a flow diagram illustrating processing a separate request for a configuration change to an image forming device based on the third rule being applied, according to an example.

The example of FIG. 9 is different from the example of FIG. 6 in that at operation S920, the image forming device 300 is allowed to be reconfigured with its configuration data that is allowed to change. The remaining operations of this process flow are identical to those described in FIG. 6. That is, operations S900, S910, and S930 of FIG. 9 are identical to operations S600, S610, and S630 of FIG. 6 such that a redundant description will not be provided for sake of brevity.

FIG. 10 is a flow diagram illustrating processing a separate request for a configuration change to an image forming device based on the fourth rule being applied, according to an example.

Referring to FIG. 10, an administrator of the image forming device 300 makes a request through the image forming device 300 for a change in a configuration of the image forming device 300 at operation S1000. At operation S1010, the remote management server 200 receives the change request, determines whether the received change request is to reconfigure the image forming device 300 being currently managed through a policy, and verifies a rule currently in use for processing the separate configuration change request. For further details, reference may be made to the above description.

In the illustrated example, the remote management server 200 verifies that the fourth rule is established, as the currently applied rule, to submit, to a service provider of a plurality of image forming devices, a request for approval for a requested configuration change.

With the application of the fourth rule, the remote management server 200 accepts the requested change in the configuration data for the image forming device at operation S1020. For example, the requested change may include a change of a property value of the image forming device, an addition/deletion of an application to/from a list of applications to be installed in the device, a change of a property value of an application installed in the device, and the like.

At operation S1030, the remote management server 200 sends, to the service provider device 100, which is available to the service provider of the image forming device 300, a request for approval for the change. For example, the service provider may include a reseller who manages the plurality of image forming devices 300 by applying a policy thereto, and the service provider device 100 may be an electronic device for use by the reseller in the management of the plurality of image forming devices 300.

The remote management server 200 receives, from the service provider device 100, a response to the approval request at operation S1040 and checks the response at operation S1050. If the response is affirmative, the remote management server 200 updates the policy with the change in the configuration data at operation S1060. If the response is negative, the remote management server 200 restores the changed configuration data for the image forming device to what the configuration data was before the change is made upon the request at operation S1070.

The foregoing demonstrates that if a service provider such as a reseller uses a dynamic policy function to manage a plurality of image forming devices, a user or administrator of each of the image forming devices may make a request, through that device, for a change in a configuration of the device and that the separate configuration change request may then be processed according to a preset rule, for example, any one of the first to the fourth rules, such that in conjunction therewith, the underlying policy is changed on an as-needed basis. As such, the separate configuration change request may be employed in parallel with the policy-based management of the plurality of image forming devices.

Figure 13:
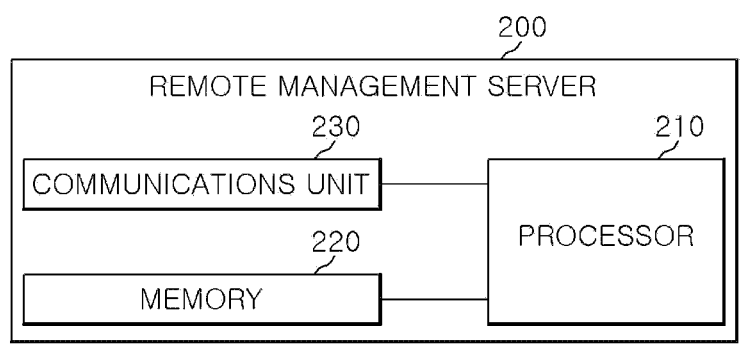
FIG. 13 is a block diagram conceptually illustrating a remote management server, according to an example.

FIG. 13 is a block diagram conceptually illustrating a remote management server, according to an example.

Referring to FIG. 13, the remote management server 200 may include a processor 210, a memory 220, and a communications unit 230. Other implementations are also contemplated. In an example, the remote management server 200 may also include an additional component, e.g., a power supply unit to supply power to the above-mentioned components, a user interface unit, or the like. In another example, the remote management server 200 may include some of, but not all of, the components shown in FIG. 13. Further, the remote management server 200 is not necessarily a single device, but may include a plurality of interconnected devices.

In an example, the processor 210 may control an operation of the remote management server 200. For example, the processor 210 may be implemented with a central processing unit (CPU), a graphics processing unit (GPU), or other processing circuitry to perform example operations as described herein. In an example, the processor 210 may execute an instruction stored in the memory 220. The processor 210 may also read information stored in the memory 220. In addition, the processor 210 may store new information in the memory 220 and may update information stored in the memory 220. For example, the processor 210 may obtain, from the memory 220, information used to control the remote management server 200 or may store such information in the memory 220.

In an example, the memory 220 may include any computer-readable storage medium that stores data in a non-transitory form. For example, the memory 220 may be implemented with Random Access Memory (RAM), Read-Only Memory (ROM), or any other type of storage medium. The memory 220 may have stored therein a variety of information, for example, a set of instructions that may be executed by the processor 210.

In an example, the communications unit 230 may enable the remote management server 200 to communicate with other entities, for example, an image forming device, a service provider device, and the like. The communication unit 230 may include a variety of communications module, for example, a wired communications module and/or a wireless communications module. For example, the wired communications module may support Local Area Network (LAN), Universal Serial Bus (USB), High Definition Multimedia Interface (HDMI), and any other suitable types of wired communication technologies. For example, the wireless communications module may support Wireless Fidelity (Wi-Fi), Wi-Fi Direct, Bluetooth, Ultra-Wide Band (UWB), Long Term Evolution (LTE), Long Term Evolution-Advanced (LTE-A), Fifth Generation (5G), Near-Field Communication (NFC), and any other suitable types of wireless communication technologies.

In an example, the remote management server 200 may include the processor 210 and the memory 220 having instructions stored therein which, based on execution by the processor 210, cause the processor 210 to operate the remote management server 200.

In an example, based on execution of the instructions, the remote management server 200 is to generate a policy including configuration data for image forming devices and a list of a plurality of image forming devices for which the configuration data is applied, receive, from one of the plurality of image forming devices, a request for a change in the configuration data for the image forming device, and process the request for the change in the configuration data according to a preset rule. The preset rule may be set as at least one of (i) a first rule for rejecting the requested change in the configuration data, (ii) a second rule for accepting the requested change in the configuration data, (iii) a third rule for accepting the requested change in the configuration data if the request is to change configuration data that is allowed to change, or (iv) a fourth rule for accepting the requested change in the configuration data and submitting, to a service provider of the plurality of image forming devices, a request for approval for the change.

For further details on the types of the preset rules and the relevant operations, reference may be made to the description provided above with respect to FIGS. 3 to 12.

In an example, based on execution of the instructions, the remote management server 200 is further to receive, from the plurality of image forming devices, the currently set configuration data, for example, at a certain periodic interval or time point, or upon request by the service provider, compare the received configuration data to the configuration data incorporated in the policy, and, if it is determined based on a result of the comparison that there is a difference in the compared data, configure the plurality of image forming devices with the configuration data corresponding to the policy.

In an example, based on execution of the instructions, the remote management server 200 is further to, based on receiving a request for onboarding of a new image forming device, verify whether the new image forming device is included in the list incorporated in the policy, and, if the new image forming device is included in the list, apply the policy to the new image forming device.

In an example, based on execution of the instructions, the remote management server 200 is further to, based on the policy being updated, perform a backup of the policy prior to the update.

Figure 14:
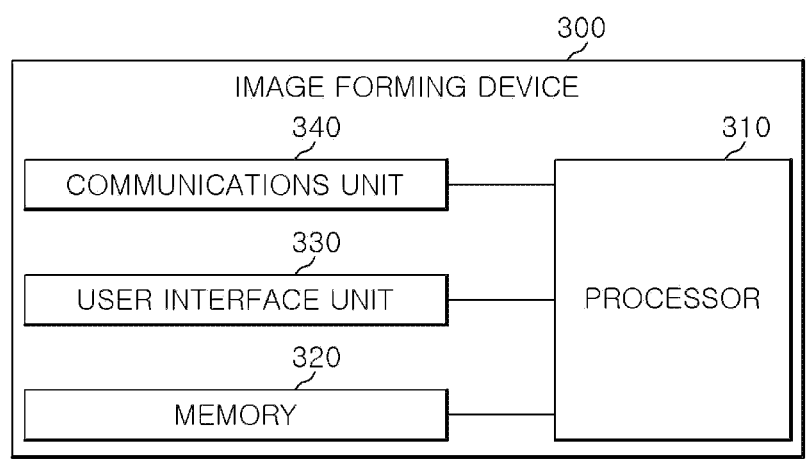
FIG. 14 is a block diagram conceptually illustrating an image forming device, according to an example.

FIG. 14 is a block diagram conceptually an image forming device, according to an example.

Referring to FIG. 14, the image forming device 300 may include a processor 310, a memory 320, a user interface unit 330, and a communications unit 340. Other implementations are also contemplated. In an example, the image forming device 300 may also include an additional component, e.g., a power supply unit to supply power to the above-mentioned components, or other units. In another example, the image forming device 300 may include some of, but not all of, the components shown in FIG. 14. Further, it may be appreciated that the image forming device 300 is not necessarily a single device, but may include a plurality of interconnected devices.

For further details on the processor 310, the memory 320, and the communications unit 340, reference may be made to the description provided above with respect to FIG. 13.

In an example, the user interface unit 330 may include an input unit and an output unit. The input unit may be implemented to receive a variety of user inputs. Examples of the input unit include a keyboard, a keypad, a physical button, a touch pad, a touch screen, and the like. The output unit may be implemented to display a result of a job of the image forming device 300 and/or to output or provide a certain message or other information such as a status of the image forming device 300. Examples of the output unit include a display panel, a speaker, and the like.

The input unit may include any other type of device that can receive a variety of inputs and the output unit may include any other type of device that can provide a variety of outputs. In an example, the image forming device 300 may include the processor 310 and the memory 320 having instructions stored therein which when executed by the processor 310, cause the processor 310 to operate the image forming device 300.

In an example, based on execution of the instructions, the image forming device 300 is to receive, from a remote management server, a policy including configuration data for the image forming device 300. In an example, the configuration data may include setting information for each image forming device, a list of applications to be installed in each image forming device, and setting information for each application.

In an example, the image forming device 300 is further to receive, from a user, a request for a change in the configuration data. For example, the image forming device 300 may receive a request made, through the user interface unit 330 by a current user or an administrator of the device, for a change in a certain setting, e.g., a resolution, of the image forming device 300.

In an example, the image forming device 300 is further to detect, based on the received policy, that the configuration of the image forming device 300 is currently managed through the policy and detect that the configuration data requested by the user to be changed corresponds to the configuration data incorporated in the policy for the management. In these examples, the image forming device 300 is further to, in response to detecting that the received change request is to change the configuration data included in the received policy, process the request for the change in the configuration data according to a preset rule.

In an example, the image forming device 300 is to detect whether the change request received from the administrator or user of the device goes against or is in conflict with the policy currently applied to the image forming device 300 or is associated with the configuration data under the policy-based management. These examples show that the image forming device 300 may perform some operations as described with respect to the remote management server and with reference to, e.g., FIG. 13, such as an operation of determining that the separate configuration change request is to change the configuration data included in and managed through the policy and thus is processed according to the preset rule.

The preset rule may be set as at least one of (i) a first rule for rejecting the requested change in the configuration data, (ii) a second rule for accepting the requested change in the configuration data, (iii) a third rule for accepting the requested change in the configuration data if the request is to change configuration data that is allowed to change, or (iv) a fourth rule for accepting the requested change in the configuration data and submitting, to a service provider, a request for approval for the change.

By way of example, the second rule may be set as (i) a rule for accepting the change in the configuration data and requesting the remote management server to update the policy to remove the image forming device from the list, (ii) a rule for accepting the change in the configuration data and requesting the remote management server to update the policy to remove the image forming device from the list and incorporate the image forming device, if rebooted or onboarded to the remote management server, back into the list, or (iii) a rule for accepting the change in the configuration data for the image forming device and requesting the remote management server to update the policy to remove the image forming device from the list and to generate a different policy corresponding to the changed configuration data and the image forming device. In other words, the image forming device 300 is to accept the separately requested configuration change and cooperate with or request the remote management server 200 to update the policy accordingly.

By way of example, based on the change in the configuration data for the image forming device 300 being accepted, the third rule may include (i) requesting the remote management server to update the policy to remove the image forming device 300 from the list, (ii) requesting the remote management server to update the policy to remove the image forming device 300 from the list and incorporate the image forming device 300, if rebooted and onboarded to the remote management server, back into the list, or (iii) requesting the remote management server to update the policy to remove the image forming device 300 from the list and to generate a different policy corresponding to the changed configuration data and the removed image forming device.

As discussed above, unlike the second rule, the third rule is applied to accept a portion of the configuration data that is allowed to change and to prevent another portion thereof from being changed.

By way of example, the fourth rule may include a rule for requesting, based on receiving from the service provider an affirmative response to the request for the approval for the change, the remote management server to update the policy with the accepted change in the configuration data, and a rule for restoring, based on receiving from the service provider a negative response to the request for the approval for the change, the changed configuration data for the image forming device to what the configuration data was before the change is made upon the request.

FIG. 15 is a schematic illustration of a user interface for selecting a rule for processing a separate request, from an image forming device to which a policy is applied, for a change in its configuration, according to an example.

As shown, based on the reconfiguration of the individual device being attempted in this separate way, other than by changing the policy through which the image forming device is managed, the rule for processing the separate request may be set through the example user interface of FIG. 15. In an example, this user interface may be presented on an electronic device, e.g., a service provider device, a remote management server, and the like, after it is verified that the device is manipulated by an authorized user to set the rule. Examples of the rule include the above-mentioned first to fourth rules. For further examples of these rules, reference may be made to the description provided above with respect to FIGS. 3 to 12. By way of example and not limitation, the example user interface of FIG. 15 may indicate specific information regarding Policy A, such as a note on the policy, a time point of application of the policy, and the like.

In an example, the service provider device 100 is to receive a processing rule through, e.g., the user interface shown in FIG. 15, and transmit, based on the received processing rule to the remote management server 200, a request for generation of a preset rule for processing a request for a change in configuration data for a plurality of listed image forming devices.

Figure 16:
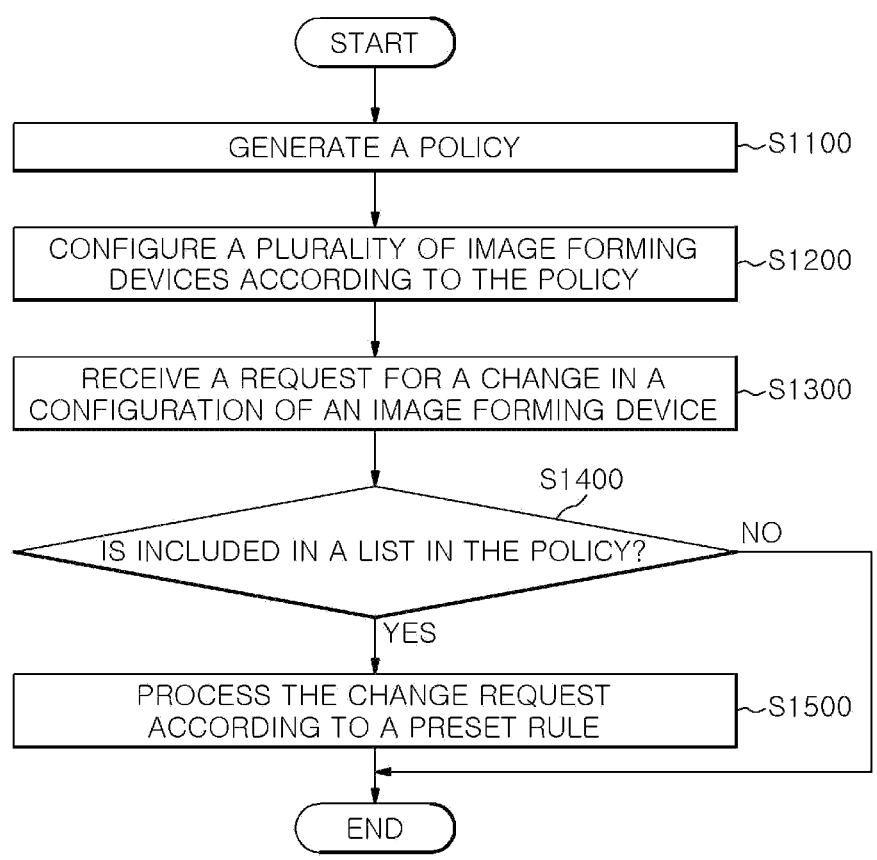
FIG. 16 is a flow diagram illustrating a method of processing a separate request for a change in a configuration of an image forming device to which a policy is applied, according to an example.

FIG. 16 is a flow diagram illustrating a method of processing a separate request for a change in a configuration of an image forming device to which a policy is applied, according to an example.

Referring to FIG. 16, the remote management server 200 generates a policy including configuration data for image forming devices and a list of a plurality of image forming devices 300 for which the configuration data is to be applied at operation S1100.

At operation S1200, the remote management server 200 configures the plurality of image forming devices 300 with the configuration data according to the policy. This job of configuring the image forming devices 300 may be performed upon generation of the policy, and/or repeatedly at certain time intervals or points. For example, the service provider may specify that the policy is to be consistently applied to the image forming devices 300 at daily or weekly intervals. Accordingly, if the service provider changes the policy, the new policy may be applied to the listed image forming devices 300 all at a specific time point so that the service provider may maintain those devices with the recent configuration data without performing a job on the devices in a one-by-one manner.

In addition, or alternatively, the remote management server 200 may manage the image forming devices 300 in a dynamic fashion by, for example, receiving, from the image forming devices 300, the currently set configuration data at a certain periodic interval or time point, or upon request by the service provider, comparing the received configuration data to the configuration data incorporated in the policy, and if it is determined based on a result of the comparison that there is a difference in the compared data, configuring the image forming devices 300 with the configuration data corresponding to the policy. At operation S1300, the remote management server 200 receives a request for a change in the configuration data for an image forming device.

At operation S1400, the remote management server 200 determines whether the image forming device, the configuration data for which is requested to be changed, is included in the list in the policy stored in the remote management server 200.

At operation S1500, the remote management server 200 processes the request for the change in the configuration data according to a preset rule. For examples on the types of the preset rules and the relevant operations, reference may be made to the description provided above with respect to FIGS. 3 to 12.

The example method may further include an operation of performing, based on the policy being updated, a backup of the policy prior to the update.

For example, the method may include an operation of performing, based on the second or third rule being applied, a backup of the policy before updating the policy to remove the image forming device, which is requested to be reconfigured, from the list of targeted devices to which the policy is applied. After the policy is changed in line with the reconfiguration of the image forming device, the backed-up policy may be used for restoring the changed policy to what it was.

In an example, the methodology disclosed herein may be incorporated into a computer program product. The computer program product may be available as a product for trading between a seller and a buyer. The computer program product may be distributed in the form of a machine-readable storage medium, e.g., compact disc read only memory (CD-ROM), or distributed online through an application store, e.g., PlayStore™. For online distribution, a portion of the computer program product may be temporarily stored, or temporarily created, in a storage medium such as a server of the manufacturer, a server of the application store, or a storage medium such as memory of a relay server.

The foregoing description has been presented to illustrate and describe various examples. It should be understood that many modifications and variations are possible in light of the above description. In various examples, suitable results may be achieved if the above-described techniques are performed in a different order, and/or if some of the components of the above-described systems, architectures, devices, circuits, and the like are coupled or combined in a different manner, or substituted for or replaced by other components or equivalents thereof.

Although the foregoing examples are described in the context of image forming devices, it should be understood that the present disclosure is not limited to such image forming devices and is applicable in other situations where a policy is to be used for management of a plurality of user devices or electronic devices.

Therefore, the scope of the disclosure is not to be limited to the examples as disclosed, but rather defined by the following claims and equivalents thereof.

What is claimed is:

1. A remote management server, comprising:
   a processor; and
   a memory to store instructions that, based on their execution, cause the processor to:
      generate a policy comprising configuration data for image forming devices and a list of a plurality of image forming devices for which the configuration data is to be applied;
      receive, from an image forming device of the plurality of image forming devices, a request for a change in the configuration data for the image forming device in response to the image forming device receiving a separate request to perform the change to the configuration data on the image forming device;
      process the request in accordance with a preset rule for accepting the requested change;
      in response to the change in the configuration data, update the policy to remove the image forming device from the list; and
      in response to the image forming device being rebooted or onboarded to the remote management server, update the list to incorporate the image forming device.

2. The remote management server of claim 1, wherein the preset rule comprises at least one of:
   a first rule for accepting the requested change if the request is to change the configuration data that is allowed to change; or
   a second rule for accepting the requested change and submitting, to a service provider of the plurality of image forming devices, a request for approval for the change.

3. The remote management server of claim 2, wherein after receiving an affirmative response to the request for approval of the change, the remote management server updates the policy with the accepted change; and
   after receiving a negative response to the request for approval of the change, the remote management server restores the changed configuration data for the image forming device to what the configuration data for the image forming device was before the change.

4. The remote management server of claim 1, wherein, based on the change in the configuration data for the image forming device
   the remote management server generates a different policy corresponding to the changed configuration data and the removed image forming device.

5. The remote management server of claim 1, wherein, based on their execution, the instructions further cause the processor to:
   based on receiving, from an unlisted image forming device that is not comprised in the list, a request for a change in configuration data for the unlisted image forming device, change the configuration data for the unlisted image forming device.

6. The remote management server of claim 1, wherein, based on their execution, the instructions further cause the processor to:
   receive a request for onboarding of a new image forming device;
   verify whether the new image forming device is comprised in the list; and
   if the new image forming device is comprised in the list, apply the policy to the new image forming device.

7. The remote management server of claim 1, wherein, based on their execution, the instructions further cause the processor to:
   receive, at a particular periodic interval, from the plurality of image forming devices or a service provider device, the configuration data for the plurality of image forming devices;
   compare the received configuration data to the configuration data comprised in the policy; and
   configure, based on a result of the comparison, the plurality of image forming devices with the configuration data comprised in the policy.

8. An image forming device, comprising:
   a processor; and
   a memory to store instructions that, based on their execution, cause the processor to:
      receive, from a remote management server, a policy comprising configuration data for the image forming device, the remote management server having a list comprising the image forming device;
      receive, at the image forming device a request for a change in the configuration data;
      send a notification to the remote management server in response to the request; and
      in response to determining that the received request is to change the configuration data comprised in the policy, request the remote management server remove the image forming device from the list and process the request in accordance with a preset rule for accepting the requested change and to update the policy to incorporate the image forming device, if rebooted or onboarded to the remote management server, back into the list.

9. The image forming device of claim 8, wherein the preset rule comprises at least one of:
   a first rule for accepting the requested change if the request is to change the configuration data that is allowed to change; or
   a second rule for accepting the requested change and submitting, to a service provider of the image forming device, a request for approval for the change.

10. The image forming device of claim 9, wherein the first rule comprises:
    a rule for generating a different policy corresponding to the changed configuration data and the image forming device.

11. The image forming device of claim 9, wherein, based on the change in the configuration data for the image forming device being accepted, the second rule comprises:
    requesting the remote management server to update the policy to incorporate the image forming device, if rebooted or onboarded to the remote management server, back into the list; or
    requesting the remote management server to generate a different policy corresponding to the changed configuration data and the image forming device.

12. The image forming device of claim 9, wherein the second rule comprises a rule for requesting, based on receiving from the service provider an affirmative response to the request for the approval for the change, the remote management server to update the policy with the accepted change.

13. The image forming device of claim 9, wherein the second rule comprises a rule for restoring, based on receiving from the service provider a negative response to the request for the approval for the change, the changed configuration data for the image forming device to what the configuration data for the image forming device was before the change is made upon the request for the change.

14. A method, comprising:
generating a policy comprising configuration data for image forming devices and a list of a plurality of image forming devices for which the configuration data is to be applied;
receiving, from an image forming device of the plurality of image forming devices, a request for a change in the configuration data for the image forming device, in response to the image forming device receiving a separate request made to perform the change in the applied configuration data on the image forming device, and processing the request in accordance with a preset rule, wherein the preset rule comprises at least one of:

a first rule for accepting the requested change and removing the image forming device from the list of the plurality of image forming devices for which the configuration data is to be applied;

a second rule for accepting the requested change and removing the image forming device from the list of the plurality of image forming devices for which the configuration data is to be applied and updating the list to include the image forming device if the image forming device is rebooted or onboarded to a remote management server if the request is to change configuration data that is allowed to change; or a third rule for accepting the requested change, removing the image forming device from the list of the plurality of image forming devices for which the configuration data is to be applied, and generating a different policy corresponding to the changed configuration data and the removed image forming device.

* * * * *